(12) United States Patent
Allen et al.

(10) Patent No.: US 11,087,018 B2
(45) Date of Patent: Aug. 10, 2021

(54) APPARATUS, METHOD AND COMPUTER PROGRAM FOR SCRAMBLING AN IDENTIFICATION SIGNAL USING QUANTUM DOT-GRAPHENE FIELD EFFECT TRANSISTORS

(71) Applicant: Nokia Technologies Oy, Espoo (FI)

(72) Inventors: Mark Allen, Great Cambourne (GB); Troels Ronnow, Cambridge (GB); David Bitauld, Cambridge (GB); Alexander Bessonov, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 512 days.

(21) Appl. No.: 16/092,732

(22) PCT Filed: Apr. 27, 2017

(86) PCT No.: PCT/FI2017/050318
§ 371 (c)(1),
(2) Date: Oct. 10, 2018

(87) PCT Pub. No.: WO2017/187018
PCT Pub. Date: Nov. 2, 2017

(65) Prior Publication Data
US 2021/0200893 A1    Jul. 1, 2021

(30) Foreign Application Priority Data
Apr. 28, 2016    (EP) .................................... 16167377

(51) Int. Cl.
*G06K 9/74*    (2006.01)
*G06F 21/62*    (2013.01)

(52) U.S. Cl.
CPC ................................ *G06F 21/6245* (2013.01)

(58) Field of Classification Search
CPC .............. G06F 21/6245; G06K 9/2027; G06K 9/00885; G06K 2009/00932;
(Continued)

(56) References Cited

U.S. PATENT DOCUMENTS

| 3,239,895 | A | * | 3/1966 | Stuckert | ................. | H01R 12/58 |
| | | | | | | 164/260 |
| 4,307,416 | A | * | 12/1981 | Spano | ................. | H04N 7/1716 |
| | | | | | | 348/E7.068 |

(Continued)

FOREIGN PATENT DOCUMENTS

EP    3163633 A1    5/2017

OTHER PUBLICATIONS

"PalmSecure® F-Pro Suite", Fujitsu, Retrieved on Oct. 9, 2018, Webpage available at : http://www.fujitsu.com/us/solutions/business-technology/security/palmsecure/palmsecure/index.html.
(Continued)

*Primary Examiner* — Jeffrey C Pwu
*Assistant Examiner* — Nega Woldemariam
(74) *Attorney, Agent, or Firm* — Nokia Technologies Oy

(57) ABSTRACT

An apparatus, method and computer program wherein the apparatus comprises: a plurality of quantum dot-graphene field effect transistors; circuitry configured to provide an individual drain-source bias voltage to each of a plurality of quantum dot-graphene field effect transistors, wherein different individual drain-source bias voltages have different parameters, to enable the plurality of quantum dot-graphene field effect transistors to detect light from a user of an apparatus; and circuitry configured to obtain output signals from each of a plurality of quantum dot-graphene field effect transistors where the output signal is dependent upon both the light detected by the quantum dot-graphene field effect transistor and the parameters of the drain-source bias voltage (Continued)

to enable the obtained output signals to be used as a scrambled identification signal of the user of the apparatus.

20 Claims, 8 Drawing Sheets

(58) Field of Classification Search
CPC .......... G06K 2009/00939; G06K 2009/00953; A61B 5/1171; A61B 5/0035; A61B 5/0037; A61B 5/489; A61B 5/024
USPC .......................................................... 726/26
See application file for complete search history.

(56) References Cited

U.S. PATENT DOCUMENTS

| | | | | |
|---|---|---|---|---|
| 8,049,597 | B1 * | 11/2011 | Murakami | G06K 9/00979 340/5.82 |
| 10,893,043 | B1 * | 1/2021 | John | G06K 9/0053 |
| 2002/0060587 | A1 * | 5/2002 | Kimball | H04L 25/0274 327/108 |
| 2015/0277559 | A1 | 10/2015 | Vescovi et al. | |
| 2017/0024771 | A1 * | 1/2017 | Flitsch | A61B 5/6821 |
| 2017/0173262 | A1 * | 6/2017 | Veltz | A61B 5/0022 |
| 2017/0181669 | A1 * | 6/2017 | Lin | A61B 5/145 |
| 2017/0350882 | A1 * | 12/2017 | Lin | A61B 5/6821 |
| 2018/0368743 | A1 * | 12/2018 | Lin | H01L 29/1606 |
| 2020/0127096 | A1 * | 4/2020 | Eendebak | H01L 29/127 |
| 2020/0193156 | A1 * | 6/2020 | Ralston | G06F 21/32 |
| 2020/0410314 | A1 * | 12/2020 | Stahlhut | G06K 19/07707 |

OTHER PUBLICATIONS

Fuentes et al. "A Vein Map Biometric System", Systemics, Cybernetics and Informatics, vol. 11, No. 4, 2013, pp. 13-18.
Sarkar et al., "Palm Vein Authentication System: A Review", International Journal of Control and Automation, vol. 3, No. 1, Mar. 2010, pp. 27-34.
Konstantatos et al., "Hybrid Graphene-Quantum Dot Phototransistors with Ultrahigh Gain", Nature Nanotechnology, vol. 7, May 6, 2012, 14 pages.
"Replacing Your Password with a Finger Swipe", MIT Technology Review, Retrieved on Oct. 9, 2018, Webpage available at : https://www.technologyreview.com/s/429037/replacing-your-password-with-a-finger-swipe/.
"Flexible Printed Circuits Design Guide", Tech-Etch, Retrieved on Oct. 4, 2018, Webpage available at : https://www.tech-etch.com/flex/flex_design_guide.pdf.
Extended European Search Report received for corresponding European Patent Application No. 16167377.7, dated Oct. 13, 2016, 10 pages.
Parziale et al., "Touchless Fingerprinting Technology", Advances in Biometrics, Springer, 2014, pp. 37-38.
Watanabe et al., "Palm Vein Authentication", Advances in Biometrics, Springer, 2008, pp. 76-94.
Wolf, "Applications of Graphene", Graphene: a New Paradigm in Condensed Matter and Device Physics, Oxford University Press, 2013, pp. 237-244.
International Search Report and Written Opinion received for corresponding Patent Cooperation Treaty Application No. PCT/FI2017/050318, dated Jul. 10, 2017, 23 pages.
Maienborn et al., "Modality", Semantics: An International Handbook of Natural Language Meaning, De Gruyter Mouton, 2011, pp. 1485-1485.
Office action received for corresponding European Patent Application No. 16167377.7, dated Mar. 4, 2021, 19 pages of office action.

* cited by examiner

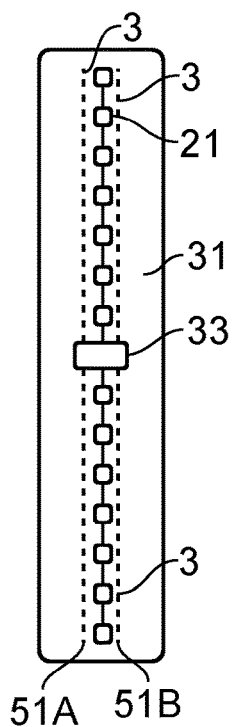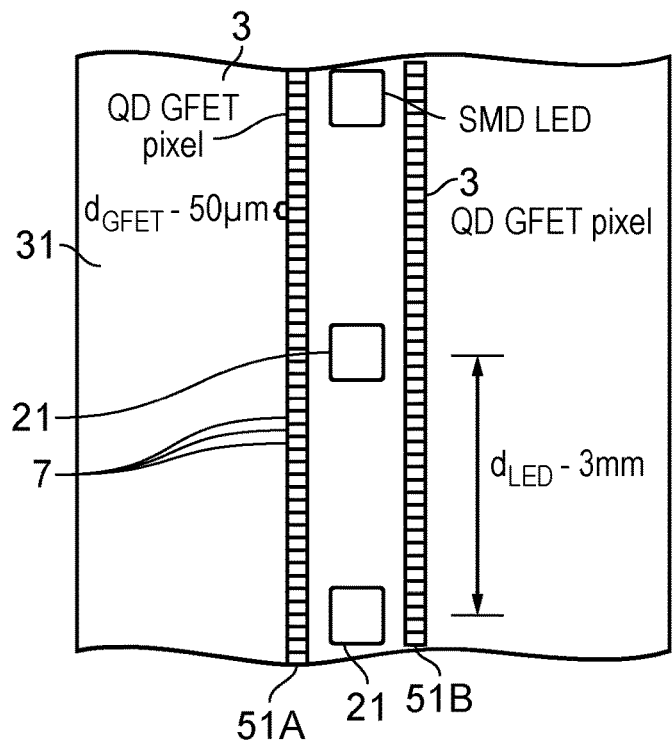
FIG. 5A
FIG. 5B
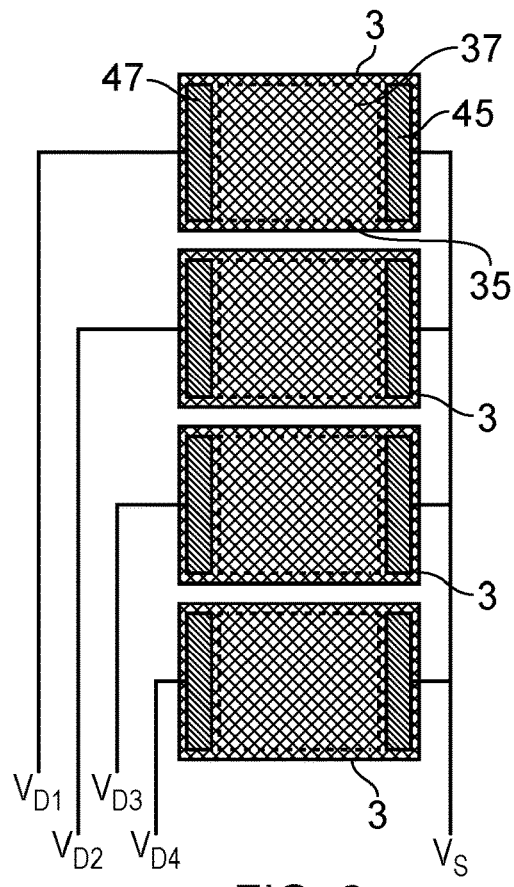
FIG. 6

APPARATUS, METHOD AND COMPUTER PROGRAM FOR SCRAMBLING AN IDENTIFICATION SIGNAL USING QUANTUM DOT-GRAPHENE FIELD EFFECT TRANSISTORS

RELATED APPLICATION

This application was originally filed as PCT Application No. PCT/FI2017/050318 filed Apr. 27, 2017 which claims priority benefit from EP Patent Application No. 16167377.7 filed Apr. 28, 2016.

TECHNOLOGICAL FIELD

Examples of the disclosure relate to an apparatus, method and computer program for using quantum dot-graphene field effect transistors. In particular they relate to an apparatus, method and computer program for using quantum dot-graphene field effect transistors for scrambling an identification signal for a user of an apparatus.

BACKGROUND

Identification devices which enable a user to be identified are known. Such devices may use any suitable parameters to authorize or authenticate a user. Some such devices may use biometric parameters. In such devices it is important that the parameters used to authorize or authenticate a user are handled securely to prevent personal information from being intercepted by unauthorized devices.

It is useful to provide an improved identification device.

BRIEF SUMMARY

According to various, but not necessarily all, examples of the disclosure there is provided an apparatus comprising: a plurality of quantum dot-graphene field effect transistors; circuitry configured to provide an individual drain-source bias voltage to each of a plurality of quantum dot-graphene field effect transistors, wherein different individual drain-source bias voltages have different parameters, to enable the plurality of quantum dot-graphene field effect transistors to detect light from a user of an apparatus; and circuitry configured to obtain output signals from each of a plurality of quantum dot-graphene field effect transistors where the output signal is dependent upon both the light detected by the quantum dot-graphene field effect transistor and the parameters of the drain-source bias voltage to enable the obtained output signals to be used as a scrambled identification signal of the user of the apparatus.

Different drain-source bias voltages may have different amplitudes.

Different drain-source bias voltages may have different pulse durations.

The apparatus may comprise at least one light emitting diode.

The apparatus may comprise a plurality of light emitting diodes where different light emitting diodes are configured to provide different wavelengths of light.

The apparatus may comprise a plurality of light emitting diodes where different light emitting diodes are configured to provide different power outputs.

The plurality of quantum dot-graphene field effect transistors may be positioned within the apparatus to detect light that has been reflected by a part of a user.

The plurality of quantum dot-graphene field effect transistors may be positioned within the apparatus to detect light that has been transmitted through a part of a user.

The apparatus may comprise at least one transmitter configured to enable the scrambled identification signal to be transmitted to another device.

The apparatus may comprise at least one transmitter configured to enable the apparatus to receive a control signal from another device such that in response to the received control signal the apparatus obtains output signals from each of the plurality of quantum dot-graphene field effect transistors.

The plurality of quantum-dot field effect transistors may be provided in at least one of; a linear array, a pseudo linear array.

The plurality of quantum dot-graphene field effect transistors may be provided on a flexible substrate.

The quantum dots may comprise colloidal quantum dots.

The apparatus may be arranged to detect light with a wavelength between 500 nm and 2000 nm.

The apparatus may be configured to be worn by a user.

The apparatus may be configured to be worn on a user's finger.

According to various, but not necessarily all, examples of the disclosure there is provided an identification device comprising an apparatus as claimed in any preceding claim.

According to various, but not necessarily all, examples of the disclosure there is provided a method comprising: providing an individual drain-source bias voltage to each of a plurality of quantum dot-graphene field effect transistors, wherein different individual drain-source bias voltages have different parameters, to enable the plurality of quantum dot-graphene field effect transistors to detect light from a user of an apparatus; obtaining an output signal from each of the plurality of quantum dot-graphene field effect transistors where the output signal is dependent upon both the light detected by the quantum dot-graphene field effect transistor and the parameters of the drain-source bias voltage; and using the obtained output signals as a scrambled identification signal of the user of the apparatus.

Different drain-source bias voltages may have different amplitudes.

Different drain-source bias voltages may have different pulse durations.

The apparatus may comprise at least one light emitting diode.

The apparatus may comprise a plurality of light emitting diodes where different light emitting diodes are configured to provide different wavelengths of light.

The apparatus may comprise a plurality of light emitting diodes where different light emitting diodes are configured to provide different power outputs.

The plurality of quantum dot-graphene field effect transistors may be positioned to detect light that has been reflected by a part of a user.

The plurality of quantum dot-graphene field effect transistors may be positioned to detect light that has been transmitted through a part of a user.

The method may comprise enabling the scrambled identification signal to be transmitted to another device.

The method may comprise receiving a control signal from another device and in response to the received control signal obtaining output signals from each of the plurality of quantum dot-graphene field effect transistors.

The plurality of quantum-dot field effect transistors may be provided in at least one of; a linear array, a pseudo linear array.

The plurality of quantum dot-graphene field effect transistors may be provided on a flexible substrate.

The quantum dots may comprise colloidal quantum dots.

The quantum dot-graphene field effect transistors may be arranged to detect light with a wavelength between 500 nm and 2000 nm.

The apparatus may be configured to be worn by a user.

The apparatus may be configured to be worn on a user's finger.

According to various, but not necessarily all, examples of the disclosure there is provided an apparatus comprising: processing circuitry; and memory circuitry including computer program code, the memory circuitry and the computer program code configured to, with the processing circuitry, enable the apparatus to perform: providing an individual drain-source bias voltage to each of a plurality of quantum dot-graphene field effect transistors, wherein different individual drain-source bias voltages have different parameters, to enable the plurality of quantum dot-graphene field effect transistors to detect light from a user of the apparatus; obtaining an output signal from each of the plurality of quantum dot-graphene field effect transistors where the output signal is dependent upon both the light detected by the quantum dot-graphene field effect transistor and the parameters of the drain-source bias voltage; using the obtained output signals as a scrambled identification signal of the user of the apparatus.

According to various, but not necessarily all, examples of the disclosure there is provided a computer program comprising computer program instructions that, when executed by processing circuitry, enable: providing an individual drain-source bias voltage to each of a plurality of quantum dot-graphene field effect transistors, wherein different individual drain-source bias voltages have different parameters, to enable the plurality of quantum dot-graphene field effect transistors to detect light from a user of an apparatus; obtaining an output signal from each of the plurality of quantum dot-graphene field effect transistors where the output signal is dependent upon both the light detected by the quantum dot-graphene field effect transistor and the parameters of the drain-source bias voltage; using the obtained output signals as a scrambled identification signal of the user of the apparatus.

According to various, but not necessarily all, examples of the disclosure there is provided a computer program comprising program instructions for causing a computer to perform any of the methods described above.

According to various, but not necessarily all, examples of the disclosure there is provided a physical entity embodying the computer program as described above.

According to various, but not necessarily all, examples of the disclosure there is provided an electromagnetic carrier signal carrying the computer program as described above.

According to various, but not necessarily all, examples of the disclosure there is provided examples as claimed in the appended claims.

BRIEF DESCRIPTION

For a better understanding of various examples that are useful for understanding the detailed description, reference will now be made by way of example only to the accompanying drawings in which:

FIG. 1 is an apparatus;
FIG. 2 is a cross section of an apparatus;
FIG. 3 is cross section of an apparatus;
FIG. 4 is a perspective view of an apparatus;
FIGS. 5A and 5B are quantum dot-photodetectors that may be used in some apparatus;
FIG. 6 illustrates quantum dot-photodetectors that may be used in some apparatus;
FIG. 7 is an apparatus in use;
FIG. 8 is a cross section of a finger;
FIG. 9 is an apparatus is use;
FIGS. 10A and 10B is an example of a scrabled ouput signal;
FIG. 11 is a method;
FIG. 12 is another apparatus.

DETAILED DESCRIPTION

The Figures illustrate an apparatus 1 comprising: a plurality of quantum dot-graphene field effect transistors 3; circuitry 5 configured to provide an individual drain-source bias voltage to each of a plurality of quantum dot-graphene field effect transistors 3, wherein different individual drain-source bias voltages have different parameters, to enable the plurality of quantum dot-graphene field effect transistors 3 to detect light from a user of an apparatus 1; and circuitry 7 configured to obtain output signals from each of a plurality of quantum dot-graphene field effect transistors 3 where the output signal is dependent upon both the light detected by the quantum dot-graphene field effect transistor 3 and the parameters of the drain-source bias voltage to enable the obtained output signals to be used as a scrambled identification signal of the user of the apparatus 1.

The apparatus 1 may be for scrambling an identification signal of a user of the apparatus 1. The apparatus 1 may enable the identification signal to be scrambled so that only authorised devices have access to the identification signal. The scrambled signal may then be securely transmitted to another device. Such apparatus 1 may be used in a secure identification or authorisation system. In some examples the apparatus 1 may be used to obtain secure biometric data from a user.

FIG. 1 schematically illustrates an apparatus 1 according to examples of the disclosure. The apparatus 1 may be arranged to detect incident light and provide an output signal indicative of the incident light. The output signal may be scrambled by the apparatus 1 to provide a scrambled output signal. The scrambled signal is secure because it can only be unscrambled by authorised devices.

The apparatus 1 comprises a plurality of quantum dot-graphene field effect transistors (QD-GFETs) 3, circuitry 5 configured to provide a drain-source bias voltage to each of the plurality of QD-GFETs 3 and read out circuitry 7 configured to obtain output signals from each of the plurality of QD-GFETs 3. It is to be appreciated that in some examples the apparatus 1 may comprise components which are not illustrated in FIG. 1. For example, the apparatus 1 may comprise one or more light emitting diodes (LEDs) 21, one or more transceivers, control circuitry 33, memory circuitry or any other suitable components.

The plurality of QD-GFETs 3 may be configured in any suitable arrangement. In some examples the QD-GFETs 3 may be arranged in an array such as a linear array or a pseudo linear array. The arrangement of the QD-GFETs 3 may depend upon the configuration of the read out circuitry 7, the light that the apparatus 1 is arranged to detect or any other suitable factors.

In the schematic example of FIG. 1 five QD-GFETs 3 are illustrated. It is to be appreciated that any number of QD-GFETs 3 could be used in examples of the disclosure.

In some examples the plurality of QD-GFETs 3 may be provided on a substrate 31. The plurality of QD-GFETs 3 may be provided on a flexible substrate 31. This may enable a flexible apparatus 1 to be provided. Having a flexible substrate 31 may enable the apparatus 1 to be attached to a part of a users body. In some examples this may enable the plurality of QD-GFETs 3 to be formed into an apparatus 1 having any suitable shape. For instance in some examples the QD-GFETs 3 may be provided on a flexible substrate 31 which is then rolled into a ring shape. The ring shape could be sized and shaped to fit around a user's finger or wrist or any other suitable part of their body. The apparatus 1 may be provided in other shapes in other examples of the disclosure.

The QD-GFETs 3 may be arranged to detect incident light such that an output signal provided by a QD-GFET 3 is dependent upon the light incident on the QD-GFET 3. Each of the plurality of QD-GFETs 3 may comprise a graphene channel 37 functionalised with quantum dots 41. Examples of QD-GFETs 3 which may be used in some examples of the disclosure are shown in FIG. 3.

The quantum dots 41 may comprise a semiconductor nanocrystal in which there is quantum confinement in all three dimensions. The quantum dots 41 may comprise any suitable semiconductor material. The semiconductor material that is used for the quantum dots 41 may be chosen to enable incident light to be detected. In some examples the quantum dots 41 may comprise lead sulphide, cadmium sulphide, cadmium selenide, or any other suitable material.

The material and/or dimensions of the quantum dots 41 may be selected to optimise the wavelength of light that is detected by the QD-GFETs 3. In some examples different QD-GFETs 3 may be optimised to detect different wavelengths of light.

The quantum dots 41 convert incident light into electrical charge. The changes in charge distribution caused by the incident light may be detected by the graphene channel which produces a measurable electronic response. The electronic response provides an indication of the amount of light which is incident on the QD-GFET 3.

The functionalised graphene channel 37 extends between a source electrode 45 and a drain electrode 47. The circuitry 5 configured to provide individual drain-source bias voltage to each of the QD-GFETs 3 may comprise means configured to control the bias voltage between the drain electrode 47 and the source electrode 45 for each of the plurality of QD-GFETs 3. The circuitry 5 may be configured to address each of the QD-GFETs 3 individually. This may enable a different drain-source bias voltage to be provided to different QD-GFETs 3. The drain-source bias voltage that is provided to any given QD-GFET 3 may be independent of the drain-source bias voltage that is provided to any other QD-GFET 3 within the plurality of QD-GFETs 3.

Different individual drain-source bias voltages may have different parameters. The different parameters may cause the output signal that is provided by the QD-GFET 3 to be varied. The parameters of the drain-source bias voltage could comprise any one or more of the amplitude of the drain-source bias voltage, a pulse duration of the drain-source bias voltage or any other suitable parameter.

The read out circuitry 7 may comprise any means that may be configured to obtain output signals from each of the plurality of QD-GFETs 3. The read out circuitry 7 may be configured to read out the output signal from each of the individual QD-GFETs 3. The read out circuitry 7 may be configured to address each of the QD-GFETs 3 individually.

When the apparatus is 1 in use the plurality of QD-GFETs 3 may be configured to detect light from the user of the apparatus 1 such that the output provided by a QD-GFET 3 is indicative of a biometric feature of a user. The light that is detected by the QD-GFETs 3 may comprise light that has been absorbed and re-emitted, scattered or reflected by biometric features within the user's body. In some examples the light that is detected may comprise light that has been transmitted through a part of the user's body. This may enable biometric features of the user to be identified. The biometric features could comprise blood vessels, bones, tendons or any other suitable biometric features to be identified. For examples a vein pattern of a user would be unique to that user and the scattering and absorption of the light by the vein pattern can be used to provide an identification signal.

The output provided by the QD-FETs 3 is also proportional to the parameters of the drain-source bias voltage. The output provided by the QD-FETs 3 may be linearly proportional to the amplitude of the drain-source bias voltage or any other suitable parameter. This means that the output provided by each of the QD-FETs 3 is dependent both on the light that is incident on the QD-GFETs 3 and the parameters of the drain-source bias voltage. Therefore by providing different drain-source bias voltages to different QD-GFETs 3, the output signal provided by the apparatus 1 may be scrambled. This may provide a secure output signal which can only be unscrambled by an entity which knows the different drain-source bias voltages that were provided to each of the plurality of QD-GFETs 3.

FIG. 2 illustrates a cross section of an apparatus 1 according to examples of the disclosure. The apparatus 1 comprises a plurality of QD-GFETs 3, circuitry 5 configured to provide a drain-source bias voltage and read out circuitry 7. The apparatus 1 also comprises a plurality of LEDs 21.

In the example of FIG. 2 the apparatus 1 is arranged in a ring. The ring comprises a circular member 23 which may be sized and shaped to fit onto a finger 71 or other part of a user's body. This may enable the apparatus 1 to be used to obtain biometric data from the user. The biometric data may comprise information relating to biometric features of the user's body such as vein pattern. Other shapes and sizes of apparatus 1 may be used in other examples of the disclosure.

The plurality of QD-GFETs 3 are positioned on an inner face 27 of the ring. The plurality of QD-GFETs 3 are positioned on the inner face 27 so that when a user is wearing the apparatus the QD-GFETs 3 are in contact with or are positioned adjacent to the user's skin. This may enable the QD-GFETs 3 to detect light from the user to enable biometric features of the user such as vein patterns to be identified.

The plurality of QD-GFETs 3 extend around the inner face 27 of the ring. This may enable the QD-GFETs 3 to detect light from any portion of the user's finger 71. This may enable the apparatus 1 to be used independently of the orientation of the apparatus 1 on the user's finger 71.

In the example of FIG. 2 the plurality of QD-GFETs 3 extend around almost all of the circumference of the inner face 27 of the ring except for a small section where read out circuitry 7 is provided. In some examples the plurality of QD-GFETs 3 may extend around the entire inner circumference of the inner face 27 or for substantially the entire inner circumference of the inner face 27.

In the example of FIG. 2 the QD-GFETs 3 are provided in a continuous array around the inner face 27 of the ring. The array may be continuous in that no gaps or only very small gaps are provided between adjacent QD-GFETs 3. In the example of FIG. 2 the spacing between adjacent QD- GFETs 3 may be around 50 μm. Other spacing between QD-GFETs 3 may be used in other examples of the disclosure.

In the example of FIG. 2 the apparatus 1 also comprises a plurality of light sources. In the example of FIG. 2 the light sources comprise one or more LEDs 21. The LEDs 21 may comprise any suitable type of LEDs 21. In some examples the LEDs 21 may comprise surface mount device (SMD) LEDs. In some examples the LEDs may comprise flexible LEDs which may enable a flexible apparatus 1 to be provided. Other types of light sources may be used in other examples of the disclosure.

The LEDs 21 may be positioned within the apparatus 1 so that when the apparatus 1 is being worn by a user the LEDs 21 are positioned adjacent to the skin of the user. This may enable the light provided by the LEDs 21 to be used to illuminate a part of the user's body. The QD-GFETs 3 may then detect the light that is reflected or scattered or emitted or transmitted through the user' finger 71 or other part of the user's body.

In the example apparatus 1 of FIG. 2 the plurality of LEDs 21 are provided on the inner face 21 of the ring. The plurality of LEDs 21 providing light may be positioned adjacent to or within the array of QD-GFETs 3.

The LEDs 21 may be configured to provide light having any suitable wavelength. The wavelength at which the LEDs 21 may be selected to optimise the absorbance/reflectance characteristics to enable biometric features such as vein patterns to be identified.

In some examples each of the plurality of LEDs 21 within the apparatus 1 may be arranged to provide light at the same wavelength. In other examples some of the LEDs 21 may be arranged to provide light at different wavelengths to other LEDs 21 within the apparatus 1. The different wavelengths of the light emitted by the LEDs 21 may have different absorption levels and so may enable different information to be obtained from the user's finger or other part of the user's body. The different absorption levels could enable different biometric features within the user's finger 71 or other part of the user's body to be identified.

In some examples some LEDs 21 may provide light at different levels of power to other LEDs 21 within the apparatus 1. This equalisation of power may ensure that the output signals that are provided by the QD-GFETs 3 are within a specified range. This may be useful in examples where different LEDs 21 provide light at different wavelengths. As the different wavelengths of light may have different levels of absorption this would produce different amplitudes of output signals for each of the QD-GFETs 3. The power levels of the LEDs 21 may be selected so that a similar output signal is produced for each QD-GFET 3. Having the output signals within a specified range may enable the read out circuitry 7 to be optimised for output signals within that range.

In the example apparatus of FIG. 2 spacing between adjacent LEDs 21 is much larger than the spacing between adjacent QD-GFETs 3. In the example of FIG. 2 the spacing between adjacent LEDs 21 is around 3 mm. Other spacing between LEDs 21 may be used in other examples of the disclosure.

In the example apparatus of FIG. 2 circuitry 5 for providing the drain-source bias voltage is provided within the circular member of the apparatus 1. In some examples a flexible substrate 31 may be provided within the apparatus 1. The circuitry 5 may be provided on one side of the flexible substrate 31 and the plurality of QD-GFETs 3 may be provided on the other. Thru vias 43 may be provided within the flexible substrate 31 to enable the plurality of QD-GFETs 3 to be connected to the circuitry 5. Other components of the apparatus 1 may also be provided on the flexible substrate 31 such as a transceiver, a power source and any other suitable components.

The circuitry 5 may be coupled to control circuitry 33. The control circuitry 33 may be configured to control the parameters of the individual drain-source bias voltages. In some examples the parameters of the individual drain-source bias voltages that are to be used may be received from another device. In some examples the parameters of the individual drain-source bias voltages that are to be used may be generated by the control circuitry within the apparatus 1. The parameters that are to be used for the individual drain-source bias voltages may be randomly assigned or pseudo randomly assigned. The read out circuitry 7 may be configured to enable each of the QD-GFETs 3 to be addressed individually.

The read out circuitry 7 may be connected to each of the plurality of QD-GFETs 3 as described above. The read out circuitry 7 may be provided in any suitable position within the apparatus 1. In some examples the read out circuitry 7 may also be provided on a flexible substrate.

In some examples the read out circuitry 7 may be coupled to a transceiver. This may enable the output signals that are obtained from the plurality of QD-GFETs 3 to be transmitted to another device.

FIG. 3 shows a cross section of a part of the apparatus 1 of FIG. 2 in more detail. The cross section of FIG. 3 shows the structure of some of the plurality of QD-GFETs 3.

The plurality of QD-GFETs 3 are provided on a flexible substrate 31. The substrate 31 may be a flexible printed circuit (FPC) substrate or any other suitable type of substrate. The substrate 31 is double sided so that the plurality of QD-GFETs 3 are provided on one side of the substrate 31 and circuitry 5, read out circuitry 7 and other components are provided on the other side. In the example of FIG. 3 the plurality of QD-GFETs 3 are provided on an inner face 48 of the substrate 31 and the circuitry 5, read out circuitry 7 and other components are provided on an outer face 49 of the substrate 31.

The substrate 31 may be provided within the circular member 23 of the apparatus 1. A housing or other type of encapsulation may be provided around the substrate 31 and the components provided on the substrate 31.

The plurality of QD-GFETs 3 may be formed on the surface of the substrate 31. Each of the plurality of QD-GFETs 3 comprises a source electrode 45, and a drain electrode 47. The source and drain electrodes 45, 47 may comprise any suitable conductive material such as metal.

The source and drain electrodes 45, 47 may be formed on the inner face 48 of the flexible substrate 31. Thru vias 43 may connect the source and drain electrodes 45, 47 to circuitry 5 which is provided on the outer face 49 of the substrate 31. The circuitry 5 may control the drain-source bias voltage for each of the plurality of QD-GFETs 3.

The graphene channel 37 is provided between the source and drain electrodes 45, 47. The graphene channel 37 is electrically connected to the source and drain electrodes 45, 47. The graphene channel 37 may comprise a thin layer of graphene. In some examples the graphene channel 37 may have a thickness in the range of nanometers. In some examples the graphene channel 37 may comprise an atomic monolayer of graphene.

The quantum dots 41 are coupled to the graphene channel 37. The quantum dots 41 may be colloidal quantum dots 41. In the example of FIG. 3 the quantum dots 41 are provided in a layer overlaying the graphene channel 37. In other examples the quantum dots 41 may be provided within and/or adjacent to the graphene channel 37.

The layer of quantum dots 41 may be very thin. In some examples the layer of quantum dots 41 may be two dimensional. In some examples the thickness of the layer of quantum dots 41 may be of the order of 100 nm. This may allow for optimal charge transfer from the quantum dots 41 to the graphene channel 37. The thickness of the layer of quantum dots 41 that is used may depend on the material that is used for the quantum dots 41 and/or any ligands that are used and any other suitable factors.

The graphene channel 37 and the quantum dots 41 are provided on the inner face 48 of the substrate 31. This ensures that light from the user is incident on the graphene channel 37 and the quantum dots 41.

In the example of FIG. 3 an encapsulating layer 39 is provided in the inner surface of the circular member 23. The encapsulating layer 39 is provided overlaying the graphene channel 37 and the quantum dots 41. The encapsulating layer 39 may be transparent or at least partially transparent to light of the wavelengths that are to be detected by the plurality of QD-GFETs 3. The encapsulating layer 39 may be configured to act as a barrier to protect the plurality of QD-GFETs 3 from contaminants such as water, oxygen or other chemicals.

The encapsulating layer 39 may comprise any suitable material. In some examples the encapsulating layer 39 may comprise an organic or hybrid organic-inorganic polymer material such as siloxanes, epoxy, acrylic polymers or any other suitable materials. These may be suitable for use in flexible apparatus 1. In examples where the apparatus 1 is formed into a rigid configuration the encapsulating layer 39 could comprise an inorganic encapsulant material, such as $Al_2O_3$, $Si_3N_4$, $SiO_2$ or any other suitable material.

In the example of FIG. 3 each of the plurality of QD-GFETs 3 also comprises gate electrodes 35. In the example of FIG. 3 the gate electrodes 35 are located within the substrate 31. The gate electrodes 35 are located within the substrate 31 in proximity to the graphene channels 37.

The apparatus 1 also comprises an LED 21. The LEDs 21 may be provided on the inner face 48 of the substrate 31. In the example of FIG. 3 the LED 21 is covered by the encapsulation layer 39. This ensures that the apparatus 1 has a smooth outer surface.

The LED 21 is connected to control circuitry 33. In the example of FIG. 3 the control circuitry 33 is provided on the outer face 49 of the substrate 31. The control circuitry 33 may be connected to the LED 21 by one or more thru vias 43.

The control circuitry 33 may be configured to control the LEDs 21 within the apparatus 1. The control circuitry 33 may be arranged to control when the LEDs are illuminated and the power with which the LEDs are illuminated and any other suitable parameters of the LEDs 21.

The control circuitry 33 may also be configured to control other components of the apparatus 1. For example, the control circuitry 33 may be configured to control the individual drain-source bias voltages that are provided to each of the plurality of QD-GFETs 3 and/or the read out circuitry 7.

FIG. 4 is a perspective view of the apparatus 1 of FIGS. 2 and 3. FIG. 4 shows the circular member 23. The plurality of QD-GFETs 3 may be provided underneath a transparent encapsulation layer 39 and so can be seen in the perspective view of FIG. 4. The plurality of QD-GFETs 3 are provided on the inner face 27 of the circular member 27. The plurality of QD-GFETs 3 extend in a linear array around the inner face 27 of the circular member 23. Other arrangements of QD-GFETs 3 may be used in other examples of the disclosure.

The other components of the apparatus 1 may be provided within the housing of the apparatus 1 and so are not shown in FIG. 4.

FIGS. 5A and 5B illustrate a plan view of an example array of QD-GFETs 3 that may be used in some examples of the disclosure. FIG. 5B illustrates a magnified view of a section of the array of FIG. 5A. The plan views of FIGS. 5A and 5B may be provided on the inner face 27 of the apparatus 1 of FIGS. 2 to 4 or in any other suitable apparatus 1. In some examples the arrays of QD-GFETs 3 could be provided on a flat surface that a user could touch with their hand or other part of their body.

In the examples of FIGS. 5A and 5B the plurality of QD-GFETs 3 are provided in two linear arrays 51A, 51B. The two linear arrays 51A, 51B may be provided on the surface of a substrate 31. The substrate 31 may comprise embedded routing and/or components provided on the other side of the substrate 31.

The two linear arrays 51A, 51B are parallel to each other. Each of the linear arrays 51A, 51B comprises a plurality of QD-GFETs 3. In the example of FIGS. 5A and 5B the arrays 51A, 51B of QD-GFETs 3 are identical. In the example of FIGS. 5A and 5B the arrays 51A, 51B of QD-GFETs 3 have identical routings and identical spacing between adjacent QD-GFETs 3. The spacing between adjacent QD-GFETs 3 is around 50 µm. In some examples the arrays 51A, 51B may be different, for example they may have different spacing between adjacent QD-GFETs 3 or may have different routing configurations.

In other examples of the disclosure the apparatus 1 may comprise a different number of arrays of QD-GFETs 3. For instance, if more than two linear arrays are provided this may make it easier to determine an orientation of the apparatus 1 when it is in use.

Circuitry 7 is connected to each of the QD-GFETs 3 to provide an individual drain-source bias voltage to each of the QD-GFETs 3. At least some of the circuitry 7 for providing the individual drain-source bias voltage may be provided on the other side of the substrate 31 and so is not shown in FIGS. 5A and 5B.

In the example of FIGS. 5A and 5B the LEDs 21 are provided between the two arrays 51A, 51B of QD-GFETs 3. In the example of FIGS. 5A and 5B a plurality of LEDs 21 are provided in another linear array between two arrays 51A, 51B of QD-GFETs 3.

The LEDs 21 are larger than the QD-GFETs 3 and a larger spacing is provided between adjacent LEDs 21. In the example of FIGS. 5A and 5B the spacing between LEDs is around 3 mm. Other spacing may be used in other examples of the disclosure.

The apparatus 1 also comprises control circuitry 33. The control circuitry 33 may be connected to the LEDs 21 and the plurality of QD-GFETs 3. The connections between the control circuitry 33 and the LEDs 21 and/or QD-GFETs 3 may be provided embedded within the substrate 31 and/or on the other face of the substrate 31 and so are not shown in FIGS. 5A and 5B.

The control circuitry 33 may be configured to control the light that is provided by LEDs 21 and the drain-source bias voltages that are provided to each of the QD-GFETs 3. The control circuitry 33 may also be configured to control the read out circuitry 7 to obtain the output signals from each of the QD-GFETs 3.

FIG. 6 schematically illustrates example circuitry 5 that may be used to provide drain-source bias voltage to the QD-GFETs 3 in some examples of the disclosure. In the example of FIG. 6 four QD-GFETs 3 are shown. It is to be appreciated that this may be representative of a section of the apparatus 1 and that any number of QD-GFETs 3 may be provided in other examples of the disclosure.

In the example of FIG. 6 the QD-GFETs 3 each comprise a source electrode 45 and drain electrode 47 and a graphene channel 37 extending between the source electrode 45 and the drain electrode 47. The graphene channel 37 may be functionalised with quantum dots 41 which are not shown in FIG. 6.

The QD-GFETs 3 may also comprise a gate electrode 35. The gate electrode 35 may be provided embedded within the substrate 31 and so is represented by dashed lines in FIG. 6. In some exampled the QD-GFETs 3 might not comprise the gate electrode 35.

Each of the source electrodes 453 is connected to a common source terminal so that the same source voltage is provided to each QD-GFETs 3. Each of the drain electrode 47 is individually addressed by the control circuitry 33 so that a different drain voltage can be provided to each of the QD-GFETs 3. This enables different drain-source bias voltages to be provided to each of the QD-GFETs 3.

It is to be appreciated that other arrangements could be used to provide the different drain-source bias voltages in other examples of the disclosure. For instance in other examples each of the drain electrodes 47 may be connected to a common drain terminal and each of the source electrodes 45 may be individually addressed. In other examples both the source electrode 45 and the drain electrode 47 could be individually addressed.

FIG. 7 illustrates an example apparatus 1 in use. The apparatus 1 may be as described above in relation to FIGS. 2 and 3. The apparatus 1 may comprise a plurality of QD-GFETs 3 as described above in relation to FIGS. 5A, 5B and 6. Corresponding reference numerals are used for corresponding features.

In the example of FIG. 7 the user is wearing the apparatus 1 as a ring on their finger 71. The finger 71 is shown in cross section. The finger 71 comprises a plurality of different biometric features such as flesh 73, veins 75 bone 77 and any other suitable biometric features. Each of these features may have different absorption levels for incident light.

In the example of FIG. 7 the LEDs 21 may be configured to provide infrared light 79. The infrared light 79 may be absorbed by deoxidised haemoglobin in blood flowing through the veins 75. This causes the attenuation of the infra red light as it passes through the finger 71. The pattern of the veins 75 within the finger 71 cause a unique signal to be provided when the finger is illuminated with infrared light 79. The pattern of the veins 75 within the finger 71 may be deduced from the light detected by the plurality of QD-GFETs 3.

In some examples the LEDs 21 may be controlled to be illuminated sequentially. The sequential illumination may comprise illuminating each LED 21 one at a time or illuminating small number of the LEDs 21 at any give time. This may enable different illumination combinations to be used to identify the biometric features, such as the vein pattern of the user.

When the apparatus 1 is in use information indicating the parameters to be used for the individual drain-source bias voltages for a plurality of QD-GFETs 3 is obtained. The information may be obtained in an array or matrix or in any other suitable format.

The information may be generated randomly or pseudo-randomly. In some examples the information may be generated within the apparatus 1. For example the information may be generated by the control circuitry 33 of the apparatus 1. In other examples the information may be generated by another device and transmitted to the apparatus 1. The information may be received by a transceiver of the apparatus 1 and stored in memory circuitry of the apparatus 1.

When the apparatus 1 is in use the obtained information is used to control the parameters of the drain-source bias voltage for each of a plurality of QD-GFETs 3. The parameters of the drain source bias voltage of any of the plurality of QD-GFETs 3 may be independent of the drain-source bias voltage of any other QD-GFETs 3 within the array. In some examples each QD-GFETs 3 within the array may have different parameters for a drain-source bias voltage.

The parameters of the drain-source bias voltage that are varied could comprise the amplitude of the drain-source bias voltage. In some examples the parameters of the drain-source bias voltage that are varied could comprise the length of time that a pulse of drain-source bias voltage is provided for. In some examples both the amplitude and the pulse duration and/or any other suitable parameter could be varied.

The read out circuitry 7 is configured to obtain the output signals from each of the plurality of QD-GFETs. The output signal may be provided to the control circuitry 33 and may be stored in the control circuitry 33 and/or may be transmitted to another device.

The output signal that is obtained for each of the QD-GFETs 3 is dependent both on the incident light and also on the parameters of the drain-source bias voltage. This means that information indicative of the incident light on a QD-GFET cannot be obtained from the output signal without the information indicative of the parameters of the drain-source bias voltage that was used. This means that only devices which have obtained the information indicating the parameters to be used for the individual drain-source bias voltages can obtain information indicative of the incident light and therefore obtain information indicative of the biometric features of the user. The use of different drain-source bias voltages therefore scrambles the output signals so that only authorised devices can obtain the information indicative of the biometric features of the user.

An authorised device which has access to the information indicating the parameters to be used for the individual drain-source bias voltages may be able to unscramble the output signals and obtain the information relating to the user's biometric parameters by using any suitable process which matches the responsivity of the QD-GFET 3 to the parameters of the drain-source bias voltage that have been used. The process may comprise a look up table, the use of mathematical functions or any other suitable process.

In the example described above the output signals are scrambled by using different parameters for drain-source bias voltages. It is to be appreciated that in other examples the output signals and/or the information indicating the parameters to be used for the individual drain-source bias voltages could be further encrypted using software or any other suitable method.

FIG. 8 is a cross section of a user's finger 71. The finger 71 comprises biometric features including, bone 77, tendons 81, flesh 73 and blood vessels 75.

The output signals that are obtained by any given QD-GFETs 3 within an apparatus 1 are dependent on the orientation of the apparatus 1 on the user's finger 71. The apparatus 1 may therefore comprise means for orientating the apparatus 1 so that the biometric features can be identified.

The biometric features within the finger 71 are not symmetrical. In the example of FIG. 8 the tendons 81 are positioned underneath the bone 77. This means that the orientation of the apparatus 1 can be determined by identifying the position of a QD-GFET 3 relative to the bone 77 and the tendon 81. Other biometric features may be used to calibrate the orientation of the apparatus 1 in other examples of the disclosure. For instance the orientation of the apparatus 1 could be calibrated by measuring the light which is reflected and/or transmitted by biometric features such as the hairs on the surface of the skin, an object implanted underneath the skin such as a wireless photodetector, a bone having a non-symmetrical shape or any other suitable biometric feature.

In some examples some of the QD-GFETs 3 may be configured for use in calibrating the orientation of the apparatus 1. In such examples the calibration QD-GFETs 3 may have a fixed drain-source bias voltage to ensure that biometric features used for orientation can be correctly identified.

In some examples the apparatus 1 may also be configured to correct for other factors which may affect the output signals provided by the QD-GFETs 3. For instance, movement of the user and/or the ambient temperature may affect the dimensions of capillaries and other blood vessels. The ambient light levels may affect the total amount of light incident on any given QD-GFET 3 and may affect the level of noise in the output signal. Other factors such as the skin colour of the user may introduce variations in the expected output signals between different user's. The effects of these factors may be controlled or corrected using any suitable means such as algorithms applied by the control circuitry 33 or any other suitable method.

FIG. 9 illustrates an example apparatus 1 in use. In the example of FIG. 9 the apparatus 1 is communication with another device 91.

In FIG. 9 the apparatus 1 is a ring shaped apparatus 1 which is worn on the user's finger 71. Other types of apparatus 1 may be used in other examples of the disclosure.

The device 91 with which the apparatus 1 is arranged to communicate may comprise any suitable electronic device. The electronic device could be a tablet computer, a mobile phone, a television, a security device or any other suitable device 91.

In the example of FIG. 9 the device 91 is a communication device which comprises a touch sensitive display 93. The touch sensitive display 93 could be any suitable type of touch screen such as a capacitive touch screen or a resistive touch screen.

In the example of FIG. 9 the device 91 also comprises means to enable information to be received from the apparatus. The device 91 may also comprise means to enable information to be transmitted to the apparatus 1 from the device 91. FIG. 9 shows two different methods to enable information to be received from the apparatus 1.

The first method comprises a wireless communication link 95. The wireless communication link 95 could be established between a transceiver in the apparatus 1 and a transceiver in the device 91. The wireless communication link 95 could be a short range connection so that information is only exchanged between the apparatus 1 and the device 91 when the apparatus 1 is located close to the device 91.

The communication link 95 could be established using a wireless protocol such as Bluetooth, Bluetooth Low Energy, Bluetooth Smart, 6LoWPan (IPv6 over low power personal area networks) ZigBee, ANT+, near field communication (NFC), Radio frequency identification, wireless local area network (wireless LAN) or any other suitable protocol.

The second method comprises a galvanic connection 97 between the apparatus 1 and the device 91 via the user's body. In the example of FIG. 9 the conductivity of the user's finger 71 is used to enable information to be exchanged between the apparatus 1 and the device 91 when the user is touching the device 91.

In the example of FIG. 9 the apparatus 1 and device 91 are configured to exchange information. This may enable the device 91 to send information to the apparatus 1. The device 91 may send information indicating the parameters to be used for the individual drain-source bias voltages for a plurality of QD-GFETs 3 to the apparatus 1. The apparatus 1 may send the scrambled identification signal obtained from the plurality of QD-GFETs 3 to the device 91. The device 91 may then use the scrambled identification signal and the information indicating the parameters to be used for the individual drain-source bias voltages to identify the user. This may enable secure authorisation or authentication of the user.

It is to be appreciated that the apparatus 1 could be configured to communicate with different devices. For example, the apparatus 1 could be worn on a user's finger and arranged to communicate with another wearable device such as a watch. The communication connection between the apparatus 1 and the watch could be established by a wireless connection or by a galvanic connection through the user's skin.

FIGS. 10A and 10B provide an example of how the use of different drain-source bias voltage parameters is used to scramble the identification signal provided by the apparatus 1.

Figure 1:
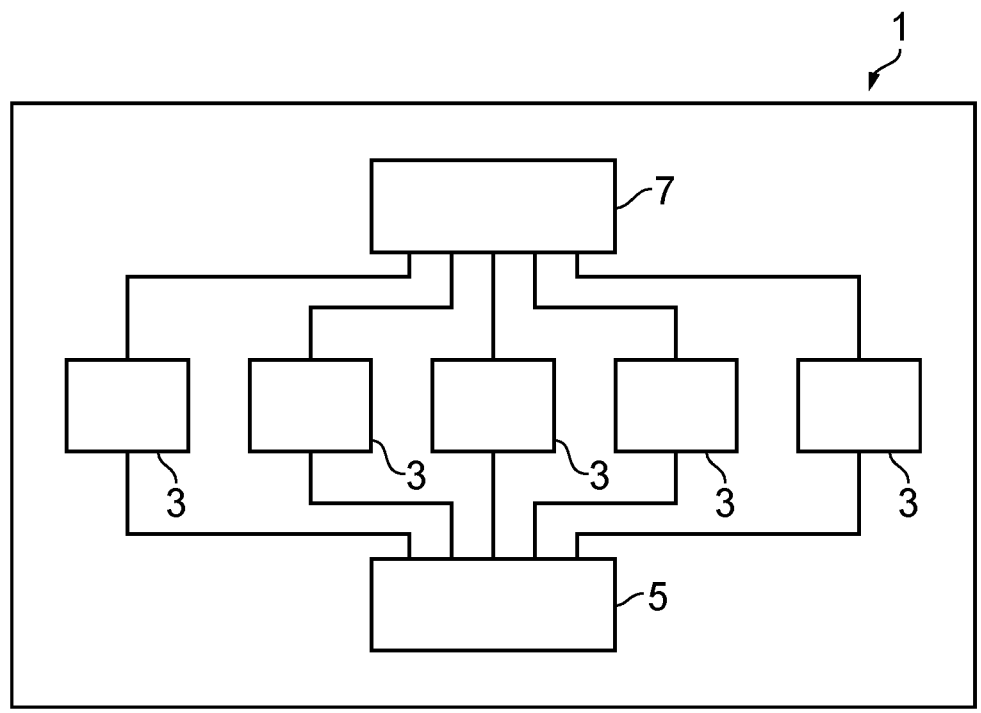
Figure 2:
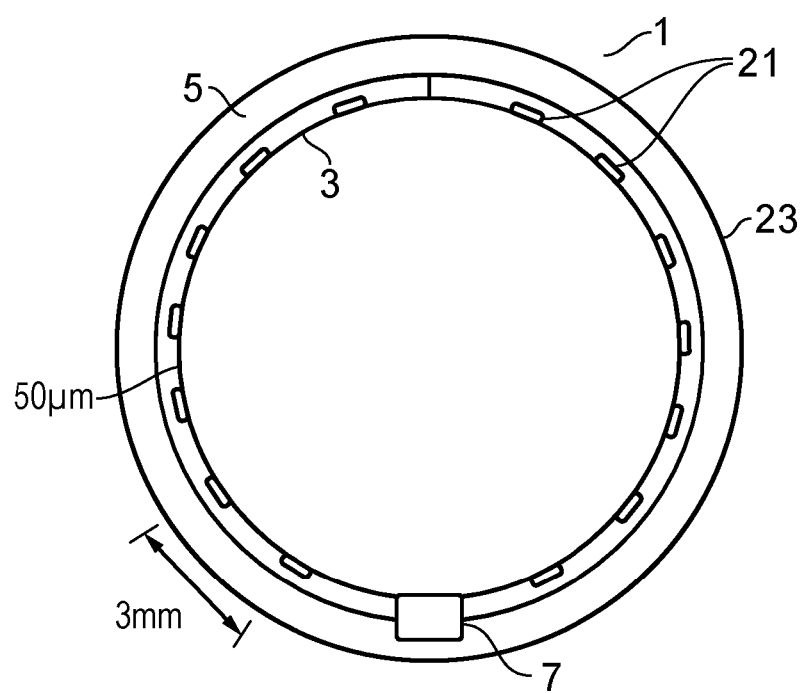
Figure 3:
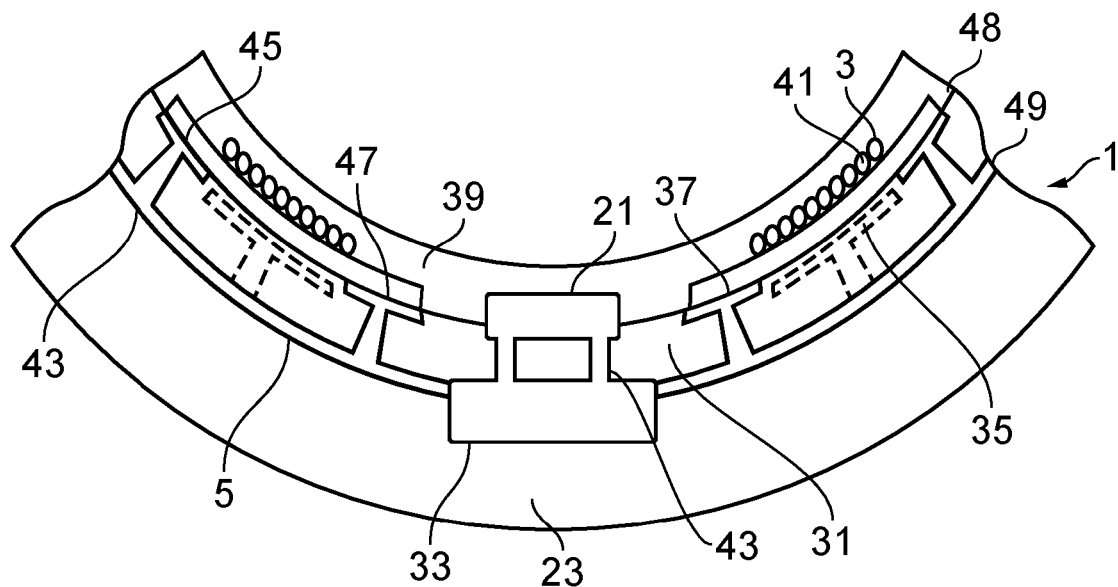
Figure 4:
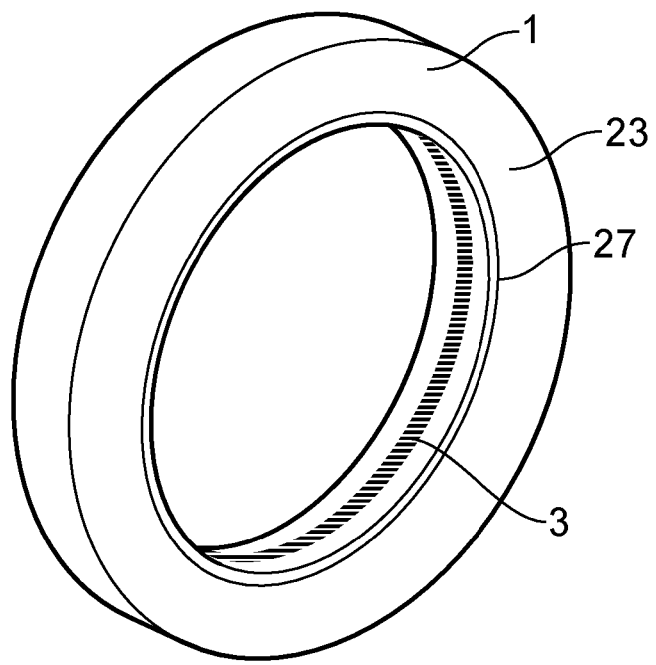
Figure 7:
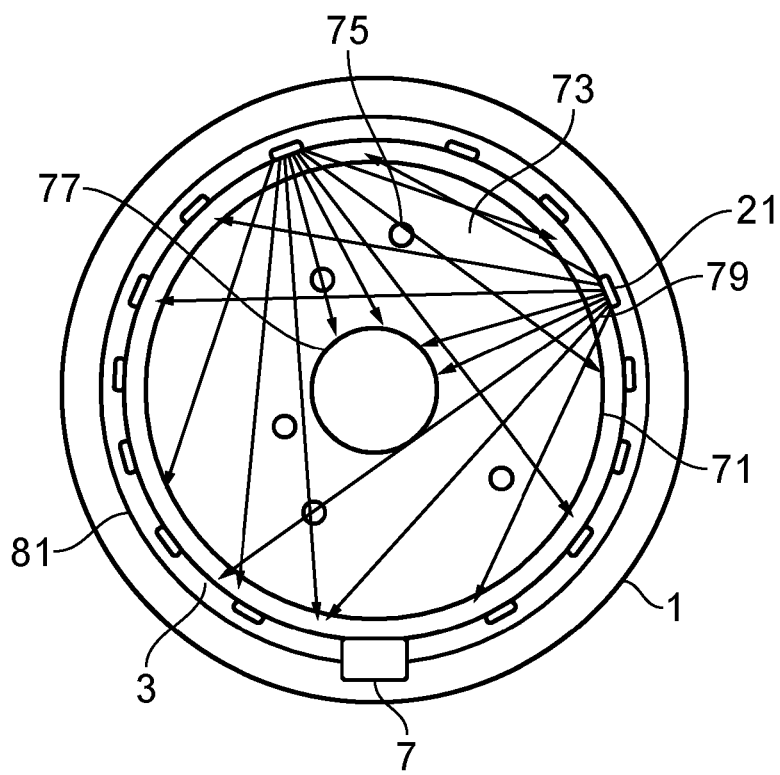
Figure 8:
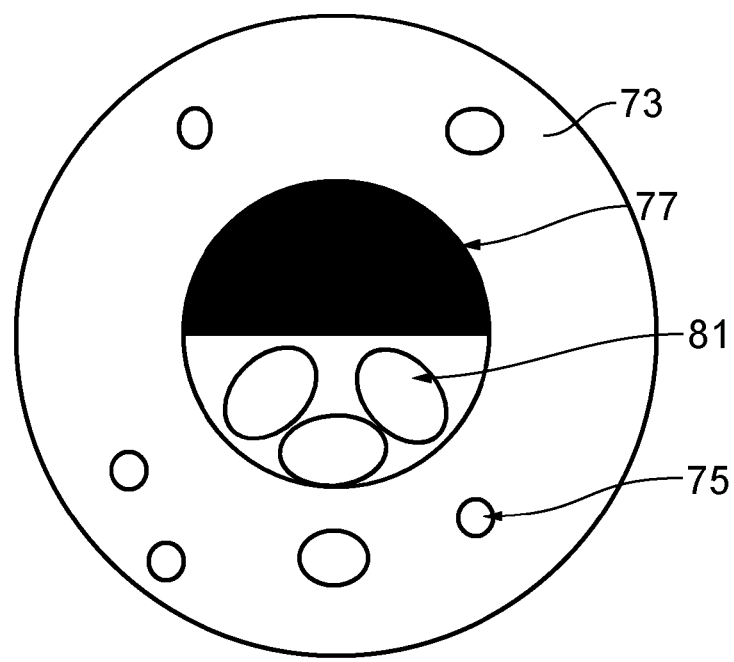
Figure 9:
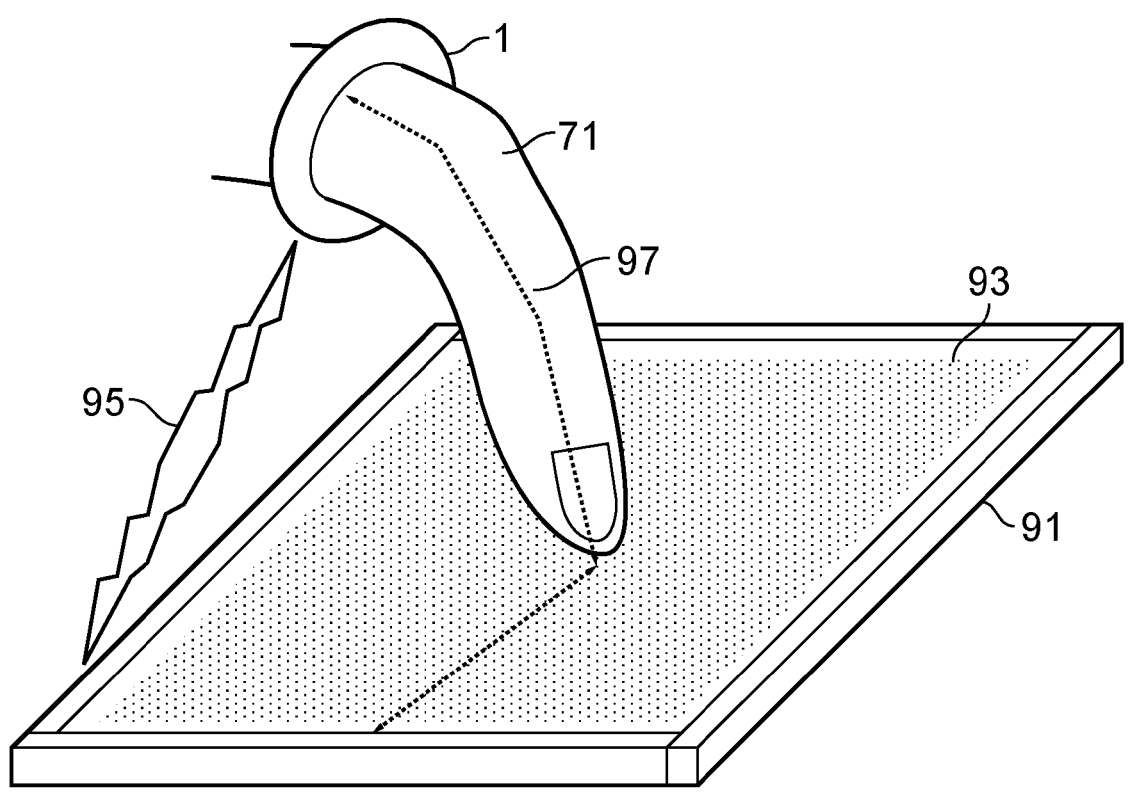
Figures 10A, 10B:
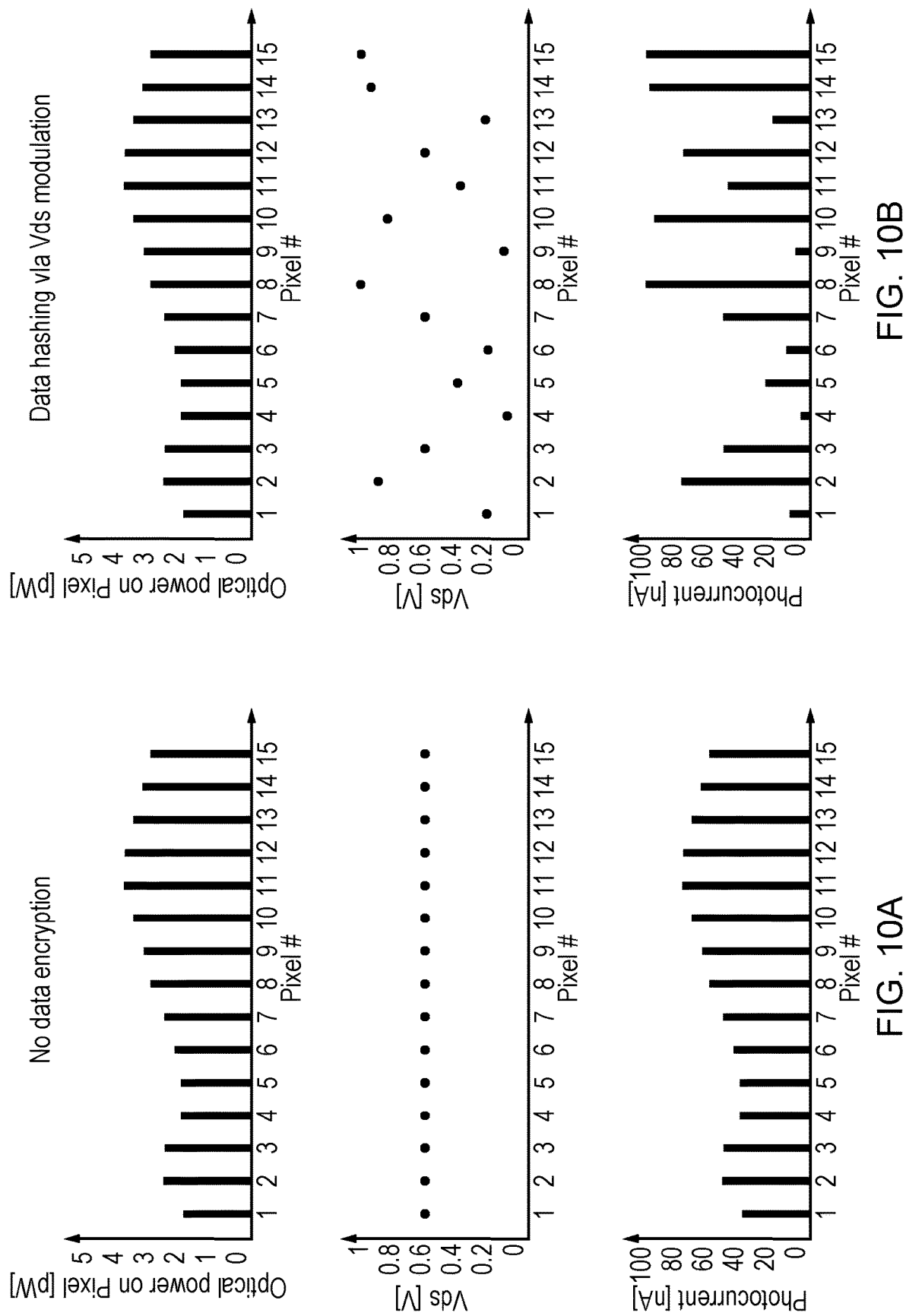
FIG. 10A illustrates an example of the output signal that would be obtained if a fixed drain-source bias voltage is used for each of the plurality of QD-GFETs 3. In this example the photocurrent output for each QD-GFET 3 is directly related to the optical power incident on the QD-GFET 3.
FIG. 10B illustrates an example of the output signal that would be obtained if different drain-source bias voltages are used for different QD-GFETs 3 within the plurality of QD-GFETs 3. In the example of FIG. 10B the different drain-source bias voltages have different amplitudes.

In the example of FIG. 10B the different QD-GFETs 3 now have a different responsivity so that the photocurrent output for each QD-GFET 3 is not directly related to the optical power incident on the QD-GFET 3. In the example of FIG. 10B the photocurrent output is proportional to both the optical power incident on the QD-GFET 3 and the amplitude of the drain-source bias voltage. In order to obtain the information about the optical power incident on the QD-GFET 3 it is necessary to know the amplitude of the drain-source bias voltage provided to the QD-GFET 3. Therefore if the scrambled signal is obtained by a device that does not have the information about the drain-source bias voltages the device would not be able to unscramble the signal. This enables the user's biometric information to be transmitted securely.

Figure 11:
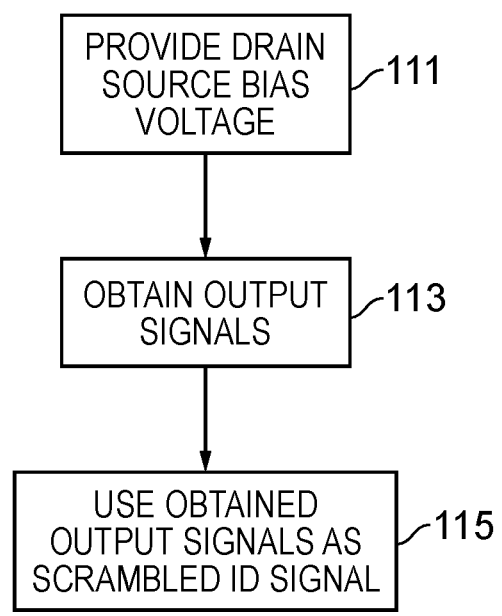

FIG. 11 illustrates an example method which may be implemented using apparatus 1 as described above. The method comprises, at block 111 providing an individual drain-source bias voltage to each of a plurality of QD-GFETs 3. The different individual drain-source bias voltages may have different parameters, to enable the plurality of QD-GFETs 3 to detect light from a user of an apparatus 1.

The method also comprises, at block 113, obtaining an output signal from each of the plurality of QD-GFETs 3 where the output signal is dependent upon both the light detected by the QD-GFET 3 and the parameters of the drain-source bias voltage. At block 115 the method comprises using the obtained output signals as a scrambled identification signal of the user of the apparatus 1.

Figure 12:
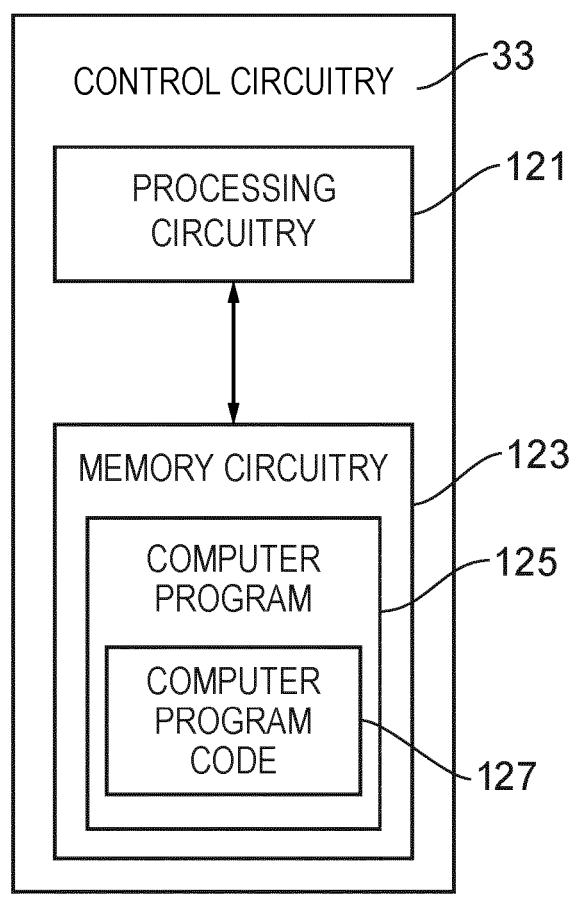

FIG. 12 is an example of control circuitry 33 that may be provided within an apparatus 1. The control circuitry 33 may be a chip or a chip-set.

The control circuitry 33 may provide means for providing an individual drain-source bias voltage to each of a plurality of QD-GFETs 3, wherein different individual drain-source bias voltages have different parameters, to enable the plurality of QD-GFETs 3 to detect light from a user of an apparatus 1; means for obtaining an output signal from each of the plurality of QD-GFETs 3 where the output signal is dependent upon both the light detected by the QD-GFET 3 and the parameters of the drain-source bias voltage; and means for using the obtained output signals as a scrambled identification signal of the user of the apparatus 1.

The control circuitry 33 comprises processing circuitry 121 and memory circuitry 123. The processing circuitry 121 may be configured to read from and write to the memory circuitry 123. The processing circuitry 121 may comprise one or more processors. The processing circuitry 121 may also comprise an output interface via which data and/or commands are output by the processing circuitry 121 and an input interface via which data and/or commands are input to the processing circuitry 121.

The memory circuitry 123 may be configured to store a computer program 125 comprising computer program instructions (computer program code 127) that controls the operation of the apparatus 1 when loaded into processing circuitry 121. The computer program instructions, of the computer program 125, provide the logic and routines that enable the apparatus 1 to perform the example methods described above. The processing circuitry 121 by reading the memory circuitry 123 is able to load and execute the computer program 125.

The apparatus 1 therefore comprises: processing circuitry 121; and memory circuitry 123 including computer program code 127, the memory circuitry 123 and the computer program code 127 configured to, with the processing circuitry 121, enable the apparatus 1 to perform: providing an individual drain-source bias voltage to each of a plurality of QD-GFETs 3, wherein different individual drain-source bias voltages have different parameters, to enable the plurality of QD-GFETs 3 to detect light from a user of the apparatus; obtaining an output signal from each of the plurality of QD-GFETs 3 where the output signal is dependent upon both the light detected by the QD-GFET 3 and the parameters of the drain-source bias voltage; using the obtained output signals as a scrambled identification signal of the user of the apparatus 1.

The computer program 125 may arrive at the apparatus 1 via any suitable delivery mechanism.

Although the memory circuitry 123 is illustrated as a single component in the figures it is to be appreciated that it may be implemented as one or more separate components some or all of which may be integrated/removable and/or may provide permanent/semi-permanent/dynamic/cached storage.

Although the processing circuitry 121 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures, Reduced Instruction Set Computing (RISC) and sequential (Von Neumann)/parallel architectures but also specialized circuits such as field-programmable gate arrays (FPGA), application-specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In the examples described above the apparatus 1 is ring shaped so that it can fit on a user's finger. It is to be appreciated that other size and shape apparatus 1 may be used in other examples of the disclosure. For instance in some examples the apparatus 1 may comprises a flat surface which may arranged to scan a users palm or other part of their body. In some examples the apparatus 1 may comprise an adhesive portion which may be configured to be attached to the user's skin.

It is to be appreciated that the apparatus 1 may comprise other components that have not been described above. For instance, the apparatus 1 may comprise a power source. The power source could be a rechargeable power source. The power source may be configured to be charged via wireless charging or any other suitable method.

In other examples the apparatus 1 might not comprise a power source but could be powered by a radio frequency signal. The radio frequency signal could be provided by the device 91. In some examples, an NFC connection could be used to power the LEDs 21 and the plurality of QD-GFETs 3 to obtain the scrambled identification signal. The scrambled identification signal would then be transmitted to the device 91 via the NFC connection. As the identification signal is already scrambled by the use of different drain-source bias voltage parameters it would not be necessary to provide additional circuitry to further encrypt or secure the signal. Such examples may enable smaller apparatus 1 to be provided as there is no requirement to provide the power source within the apparatus 1.

In some examples the scrambled identification signal may be obtained using all of the plurality of QD-GFETs 3 available in the apparatus 1. In other examples only a section of the array of QD-GFETs 3 may be used. The information obtained by a part of the array of QD-GFETs 3 may be sufficient to enable identification of the user. This may reduce the power requirements of the apparatus 1.

In some examples the apparatus 1 may comprise additional sensors which may be used to adjust or correct output signals provided by the apparatus 1. In some examples the additional sensor could comprise a temperature sensor. The temperature sensor could be configured to measure the ambient temperature. The information about the ambient temperature can then be used to account for changes in the user's blood vessels due to the temperature. For instance if it is cold a user's blood vessels may be contracted more than in a warmer temperature.

In some examples the apparatus 1 may comprise a photoplethysmography (PPG) sensor. The PPG sensor may be configured for the optical detection of blood volume changes in the microvascular bed of the tissue. The PPG sensor may use the plurality of QD-GFETs 3. The PPG sensor may obtain information about the user's heart rate and heart rate variations, respiratory rate, arterial oxygen saturation ($SpO_2$), blood pressure and any other suitable parameter.

Examples of the disclosure as described above provide an apparatus 1 that can be used to scramble an output signal from a plurality of QD-GFETs 3. This may enable biometric information to be securely exchanged between the apparatus 1 and other electronic devices. The use of QD-GFETs 3 enable the different parameters of the drain-source bias voltage to be used to be used to scramble the identification signal. The QD-GFETs 3 also provide a high responsivity and so can detect even small amounts of incident light.

The use of QD-GFETs 3 also enable the apparatus 1 to be flexible. This may make the apparatus 1 more comfortable for a user to use. This may also enable any gaps between the apparatus and the surface of the user's skin to be minimised. This may reduce the amount of noise in the output signals of the QD-GFETs 3.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
a plurality of quantum dot-graphene field effect transistors;
circuitry configured to provide a drain-source bias voltage to a plurality of quantum dot-graphene field effect transistors, wherein the drain-source bias voltage is individual to ones of said plurality of quantum dot-graphene field effect transistors, and wherein different individual drain-source bias voltages have different parameters, to enable the plurality of quantum dot-graphene field effect transistors to detect light from a user of an apparatus; and
circuitry configured to obtain output signals from the plurality of quantum dot-graphene field effect transistors where an associated output signal of a quantum dot-graphene field effect transistor is dependent upon both the light detected by the quantum dot-graphene field effect transistor and the parameters of the drain-source bias voltage of the quantum dot-graphene field effect transistor, to enable the obtained output signals to be used as a scrambled identification signal of the user of the apparatus.

2. An apparatus as claimed in claim 1 wherein the different parameter of the different drain-source bias voltages are selected from; different amplitudes, different pulse durations.

3. An apparatus as claimed in claim 1 comprising at least one light emitting diode.

4. An apparatus as claimed in claim 1 comprising a plurality of light emitting diodes where different light emitting diodes are configured to provide at least one of; different wavelengths of light, different power outputs.

5. An apparatus as claimed in claim 1 wherein the plurality of quantum dot-graphene field effect transistors are positioned within the apparatus to detect light that has been reflected by a part of a user.

6. An apparatus as claimed in claim 1 wherein the plurality of quantum dot-graphene field effect transistors are positioned within the apparatus to detect light that has been transmitted through a part of a user.

7. An apparatus as claimed in claim 1 comprising at least one transmitter configured to enable the scrambled identification signal to be transmitted to another device.

8. An apparatus as claimed in claim 1 comprising at least one transmitter configured to enable the apparatus to receive a control signal from another device such that in response to the received control signal the apparatus obtains output signals from the plurality of quantum dot-graphene field effect transistors.

9. An apparatus as claimed in claim 1 wherein the plurality of quantum-dot field effect transistors are provided in at least one of; a linear array, a pseudo linear array.

10. An apparatus as claimed in claim 1 wherein the plurality of quantum dot-graphene field effect transistors are provided on a flexible substrate.

11. An apparatus as claimed in claim 1 wherein the quantum dots comprise colloidal quantum dots.

12. An apparatus as claimed in claim 1 wherein the apparatus is arranged to detect light with a wavelength between 500 nm and 2000 nm.

13. An apparatus as claimed in claim 1 wherein the apparatus is configured to be worn by a user.

14. An identification device comprising an apparatus, said apparatus comprising: a plurality of quantum dot-graphene field effect transistors;
 circuitry configured to provide a drain-source bias voltage to a plurality of quantum dot-graphene field effect transistors, wherein the drain-source bias voltage is individual to ones of said plurality of quantum dot-graphene field effect transistors, and wherein different individual drain-source bias voltages have different parameters, to enable the plurality of quantum dot-graphene field effect transistors to detect light from a user of an apparatus; and
 circuitry configured to obtain output signals from the plurality of quantum dot-graphene field effect transistors where an associated output signal of a quantum dot-graphene field effect transistor is dependent upon both the light detected by the quantum dot-graphene field effect transistor and the parameters of the drain-source bias voltage of the quantum dot-graphene field effect transistor, to enable the obtained output signals to be used as a scrambled identification signal of the user of the apparatus.

15. A method comprising:
 providing a drain-source bias voltage to a plurality of quantum dot-graphene field effect transistors, wherein the drain-source bias voltage is individual to ones of said plurality of quantum dot-graphene field effect transistors, and wherein different individual drain-source bias voltages have different parameters, to enable the plurality of quantum dot-graphene field effect transistors to detect light from a user of an apparatus;
 obtaining output signals from the plurality of quantum dot-graphene field effect transistors, where an associated output signal of a quantum dot-graphene field effect transistor is dependent upon both the light detected by the quantum dot-graphene field effect transistor and the parameters of the drain-source bias voltage of the quantum dot-graphene field effect transistor; and
 using the obtained output signals as a scrambled identification signal of the user of the apparatus.

16. A method as claimed in claim 15, wherein the different parameter of the different drain-source bias voltages are selected from: different amplitudes, different pulse durations.

17. A method as claimed in claim 15 wherein the apparatus comprises at least one light emitting diode.

18. A method as claimed in claim 15 wherein the apparatus comprises a plurality of light emitting diodes where different light emitting diodes are configured to provide at least one of: different wavelengths of light, or different power outputs.

19. A method as claimed in claim 15 wherein the plurality of quantum dot-graphene field effect transistors are positioned within the apparatus to detect light that has been reflected by a part of a user.

20. A method as claimed in claim 15 wherein the plurality of quantum dot-graphene field effect transistors are positioned within the apparatus to detect light that has been transmitted through a part of a user.

* * * * *